(12) United States Patent
Seibold

(10) Patent No.: US 9,102,250 B2
(45) Date of Patent: Aug. 11, 2015

(54) STADIUM AND STOWING SEAT

(75) Inventor: Kurt A. Seibold, Whitmore Lake, MI (US)

(73) Assignee: Johnson Controls Technology Company, Holland, MI (US)

( * ) Notice: Subject to any disclaimer, the term of this patent is extended or adjusted under 35 U.S.C. 154(b) by 0 days.

(21) Appl. No.: 14/114,264

(22) PCT Filed: May 18, 2012

(86) PCT No.: PCT/US2012/038509
§ 371 (c)(1),
(2), (4) Date: Oct. 28, 2013

(87) PCT Pub. No.: WO2012/162123
PCT Pub. Date: Nov. 29, 2012

(65) Prior Publication Data
US 2014/0049085 A1    Feb. 20, 2014

Related U.S. Application Data

(60) Provisional application No. 61/488,463, filed on May 20, 2011.

(51) Int. Cl.
*B60N 2/30*    (2006.01)
*B60N 2/24*    (2006.01)

(52) U.S. Cl.
CPC ............... *B60N 2/3002* (2013.01); *B60N 2/24* (2013.01); *B60N 2/305* (2013.01); *B60N 2/3013* (2013.01); *B60N 2/3031* (2013.01); *B60N 2/3038* (2013.01); *B60N 2/3065* (2013.01)

(58) Field of Classification Search
CPC .. B60N 2/3002; B60N 2/3038; B60N 2/3031; B60N 2/305; B60N 2/3065; B60N 2/3013; B60N 2/24
USPC ...................................... 297/335, 340, 344.1
See application file for complete search history.

(56) References Cited

U.S. PATENT DOCUMENTS

| 4,580,832 | A | 4/1986 | Maruyama et al. |
| 4,695,094 | A | 9/1987 | Siebler |
| 4,779,926 | A | 10/1988 | Maruyama |
| 7,311,358 | B2 | 12/2007 | White et al. |
| 2008/0224520 | A1* | 9/2008 | Veluswamy et al. .......... 297/335 |
| 2009/0001795 | A1* | 1/2009 | Homier et al. ............ 297/340 X |
| 2009/0322134 | A1 | 12/2009 | Yamada et al. |
| 2013/0221719 | A1* | 8/2013 | Costaglia ...................... 297/340 |

FOREIGN PATENT DOCUMENTS

WO    2010062684 A1    6/2010

* cited by examiner

*Primary Examiner* — Anthony D Barfield
(74) *Attorney, Agent, or Firm* — Dickinson Wright PLLC

(57) ABSTRACT

A contoured collapsible seat assembly providing a compact size in the stadium position and also having the ability of the seat back to fold forward. More specifically, a collapsible seat having reduced overall height and depth in the stadium position and reduced height in the stowed position.

11 Claims, 10 Drawing Sheets

Cushion rotates 1/2 to back
Different cushion latching system due to relative movement

STADIUM AND STOWING SEAT

CROSS-REFERENCE TO PRIOR APPLICATION

This U.S. National Stage patent application claims priority to International Patent Application No. PCT/US2012/038509 filed May 18, 2012 entitled "Stadium And Stowing Seat", which claims the benefit of U.S. Provisional Patent Application Ser. No. 61/488,463 filed May 20, 2011, entitled "Stadium And Stowing Seat," the entire disclosures of the applications being considered part of the disclosure of this application and hereby incorporated by reference.

BACKGROUND

The invention relates to a contoured collapsible seat assembly providing a compact size in the stadium position and also having the ability of the seat back to fold forward. More specifically, the present invention relates to a collapsible seat having reduced and depth in the stadium position and reduced height in the stowed position.

To increase the versatility of vehicles, many modern vehicles include seats that fold or collapse. These seats commonly are designed to move to a stadium position to maximize cargo space of the vehicle. Generally, two types of such seats are available, those that fold and stow only against the floor pan of the vehicle or those that fold and stow only against the wall of a vehicle. Stowable seats that stow against the wall of the vehicle generally include additional design limitations as compared to seats that stow against the floor pan of the vehicle. For example, designers of seat assemblies may modify the floor pan of a vehicle to accommodate a comfortable seat with generous amounts of cushion and other desirable features, while using a customized well in the floor pan of the vehicle to store the seat of the vehicle. In comparison, due to the outward shape of the vehicles, designers of seats that stow against the wall of the vehicle may have limited ability to modify the interior wall of the vehicle.

SUMMARY

The invention relates to a contoured collapsible seat assembly providing a compact size in the stadium position and also having the ability of the seat back to fold forward. More specifically, the present invention relates to a collapsible seat having reduced depth in the stadium position and reduced height in the stowed position. This folding allows maximization of the cargo space by minimizing the stowed footprint of the seat while maintaining excellent comfort and safety for the user.

The present invention is more specifically directed to seat assembly comprising a seat bottom, a seat back, and a pivot base having a slot configured to constrain movement of a moveable pivot point or pin aligned with the pivot point. The pivot base further is capable of restraining a fixed pivot point from movement relative to said pivot base. The seat bottom is capable of movement about the moveable pivot point and the seat back is coupled to the pivot base at a fixed pivot point, such as via a pin in a hole and the seat back is capable of movement about the fixed pivot point. A cross member is coupled to each of the seat bottom and the seat back. The seat back may be fixed from movement relative to the pivot base, except for rotational movement about the fixed pivot.

The seat assembly is configured with the seat bottom being capable of rotational movement about the moveable pivot point and capable of movement relative to the pivot base and the seat back in addition to the rotational movement.

The seat bottom includes a first cross member pivot point and the seat back includes a second cross member pivot point and wherein the cross member is coupled to the seat back at the second cross member pivot point and the seat bottom at the first cross member pivot point and wherein the seat bottom includes a center of gravity that is not located between the moveable pivot point and the first cross member pivot point. The seat bottom may include a seat bottom frame having an outer extent including a front extension, lateral sides and wherein the center of gravity is closer to the first cross member pivot point than the front extension.

The moveable pivot point is configured to move away from the fixed pivot point as the seat back is rotated about the fixed pivot point toward the seat bottom. As such, the moveable pivot point approaches a base of the pivot base in the slot as the seat back is rotated about the fixed pivot point toward the seat bottom.

The pivot base includes a forward extent and a rearward extent, the rearward extent being proximate to the fixed pivot point and wherein the slot extends from proximate the fixed pivot point toward the forward extent and ends proximate the forward extent.

The seat assembly may include a latch assembly having a catch coupled to the seat bottom and wherein the catch is coupled to the seat back in an open position and is disengaged from the seat back in a stowed position and a stadium position.

The seat assembly includes at least three positions, an open position, a stadium position, and a stowed position and wherein in the stadium and open positions the seat back is approximately vertical and in the stowed position the seat back is more horizontal than vertical. The seat bottom is approximately vertical in the stadium position and approximately horizontal in the stowed position and capable of receiving an occupant in the open position. As the seat assembly is moved from the open position to the stowed position, the seatback is rotated above the fixed pivot point and the seat bottom is moved away from the fixed pivot point and approaches a base of the pivot base.

The seat bottom includes a seat bottom frame having a front extension. The pivot base has a fixed pivot point and a slot with a contour. As the seat assembly is moved from the open position to the stadium position, the front extension rotates about the moveable pivot point confined with the slot toward the seat back and the moveable pivot point moves away from the fixed pivot point following the contour of the slot. The movable pivot point is closer to a base of the pivot base in the stadium position than in the stowed position and the open position.

The seat assembly is free of legs or other supports, other than the pivot base on each side. More specifically the front third, preferably the front half and more preferably approximately the front two thirds are free from legs and other supports, which allows an unobstructed cargo and storage area when the seat is in the open position.

DESCRIPTION

The present invention, as illustrated in the Figures, is generally directed to a seat assembly 40 for a vehicle (not illustrated). The vehicle generally includes, although not illustrated, an interior space having interior walls generally including a rear wall and side walls, and a floor pan. The rear wall may include a rear window or be set against a cargo area. The vehicle may include door openings defined by door frames.

Figure 1:
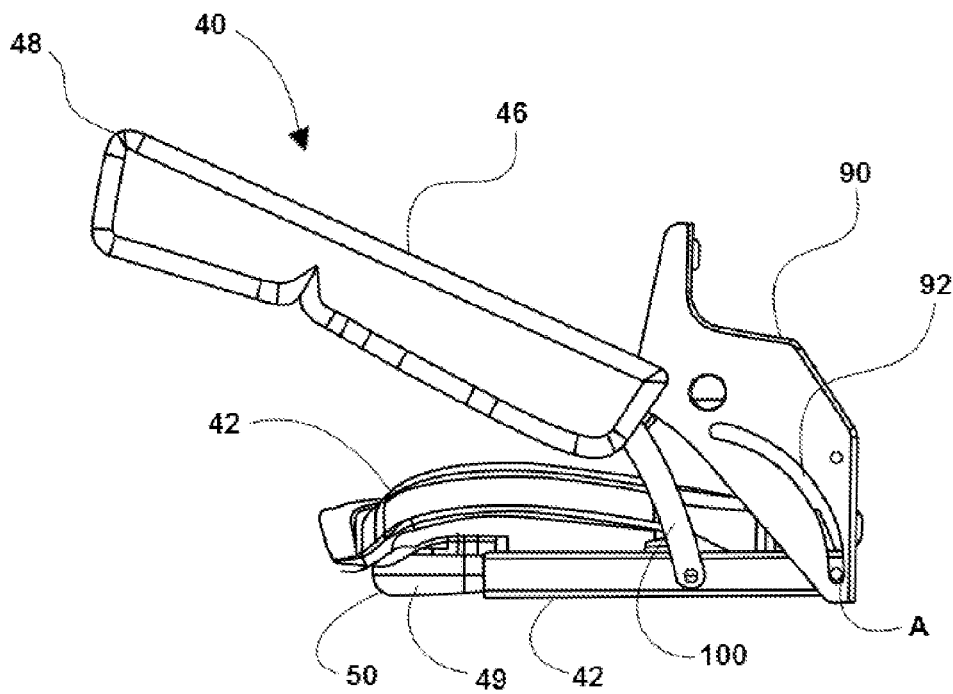
FIG. 1 is a left side view of a seat incorporating the present invention having a seat bottom and back with the seat bottom in a stadium upright position.
Figure 2:
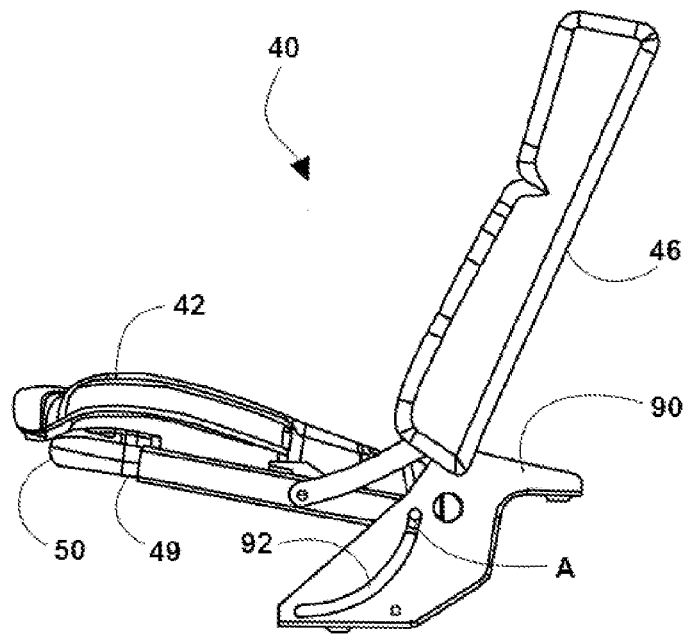
FIG. 2 is a left side view of the seat in FIG. 1 in an open or sitting position.
Figure 5:
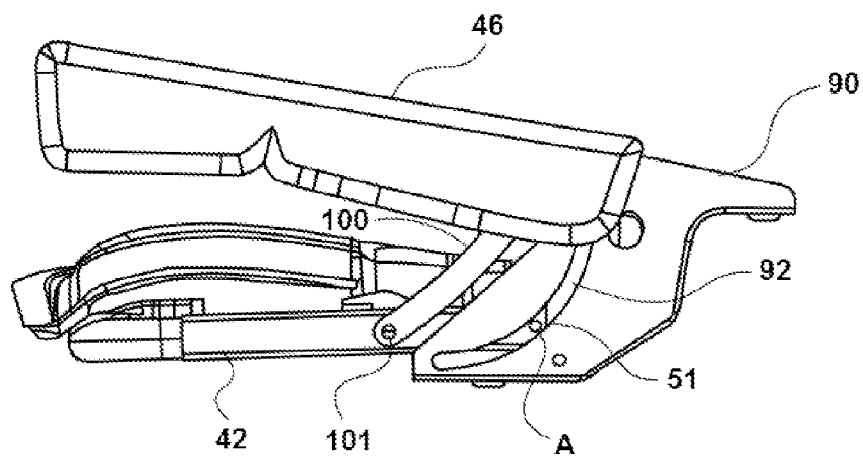
FIG. 5 is a left side and front perspective view of the seat in FIG. 1 in a stowed position with the seat bottom being vertically lowered from its open position and the seat back being folded over the seat bottom, substantially in the space normally occupied by the seat bottom in the open position, to create a compact low profile seat assembly in the stowed position.
Figure 6:
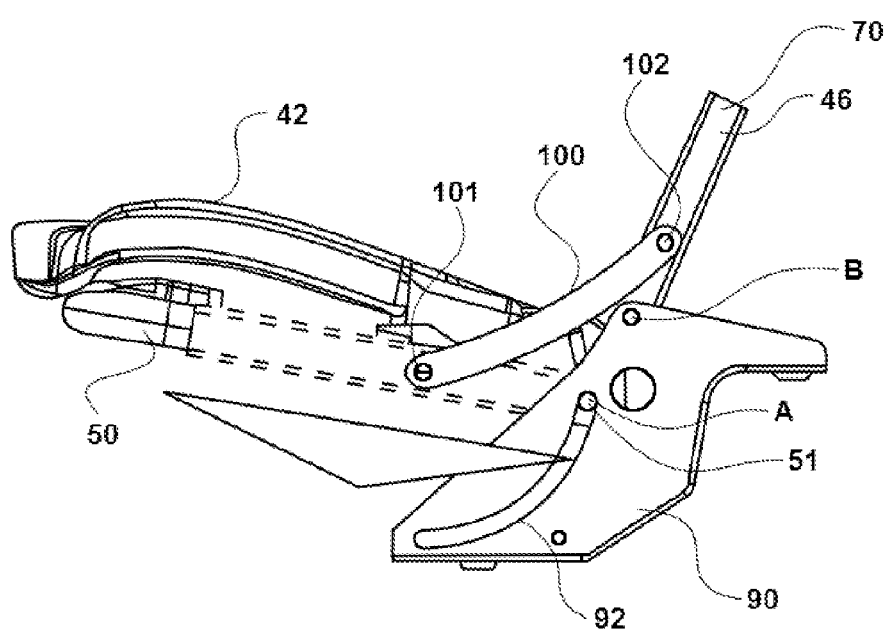
FIG. 6 is an enlarged partial left side view of the seat in FIG. 1 in an open position.

The seat assembly 40, as illustrated in FIG. 1, shows a collapsible seat for use in a vehicle. More specifically, the seat assembly 40 is typically used in the second row of a vehicle, for example, an extended cab truck. The seat assembly 40 is shown in a collapsed or otherwise known as the stadium position in FIG. 1 with the seat bottom 42 in an upright position against the seat back 46. FIG. 2 illustrates the seat assembly with the seat bottom 42 in a useable, sitting, or open position. The seat assembly 40 provides a very small package size when stowed in the stadium position along with providing known occupant comfort and safety features such as lumbar support, compliant support and a head restraint. In addition, the seat assembly 40 provides easy access under the seat bottom 42 for storage of other objects while in the open or seating position. More specifically, as illustrated in the Figures, the seat assemblies 40 are formed without vertical leg supports, other than the single pivot base on both sides, to allow easy access under the seat bottom 42 in the open position for easy access to cargo space and a clear open cargo area with maximized volume in the stadium position. In addition, the seat assembly 40 has the ability, as illustrated in FIG. 5, to fold to a stowed position, where the seat bottom 42 is lowered and the seat back 46 is folded over the seat bottom 42 in a compact package. The lack of legs forward of the pivot base 90, such as the forward half, and in some instances the forward two thirds of the seat bottom 42 allow the seat to be lightweight and reliably fold to a stowed position. While reference is made to seat assemblies used in a vehicle, it should be understood that the present invention may be used in many other applications, including, among others, airline and entertainment seating applications.

Figure 8:
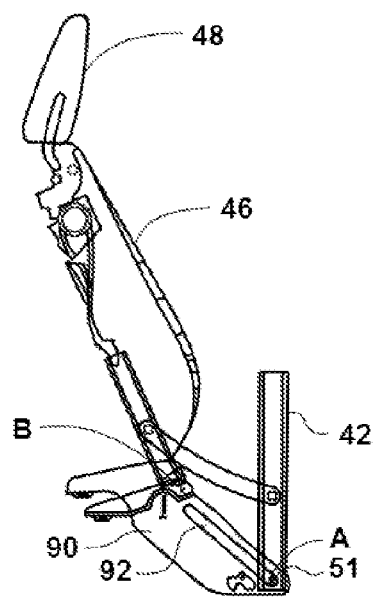
FIG. 8 is a right side schematic view of the seat with the seat bottom in a stadium position and illustrating pivoting surfaces.
Figure 9:
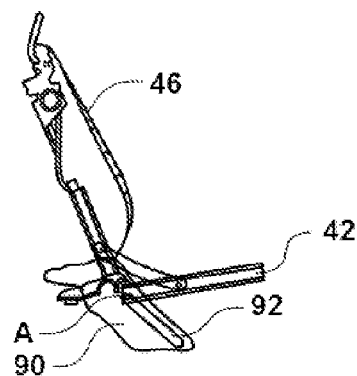
FIG. 9 is a right side schematic view of the seat in FIG. 8 in an open position and illustrating pivoting surfaces.
Figure 10:
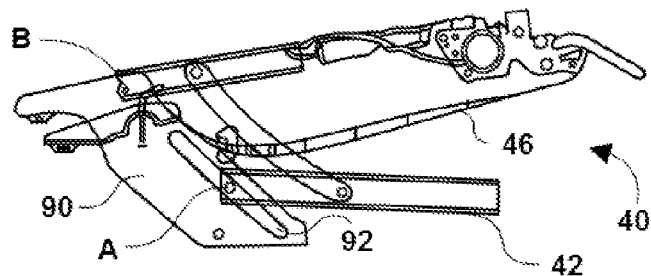
FIG. 10 is a right side schematic view of the seat in FIG. 8 in a stowed position and illustrating pivoting surfaces.

Referring to FIGS. 1-5, the seat assembly 40 includes a seat bottom 42, seat back 46, and head restraint 48. The seat assembly 40 includes a seat frame 49 having a core (not illustrated). As illustrated in FIGS. 8-10 may further include a trim cover, such as a leather or fabric material. It should be understood that the core may also be known as a foam core which may be made of any number of known materials including, but not limited to, polypropylene, polyurethane, or expanded polypropylene. FIGS. 1-4 show the seat assembly in the open and stadium positions and FIG. 5 in the stowed position. Intermediary positions between the stowed position and open position are further illustrated in FIG. 11. It can be seen that the seat assembly 40 provides a very small package size and the seat bottom 42 has a reduced overall height, in the stadium position, as well as the stowed position.

As stated above, the seat assembly 40 generally includes a seat bottom 42, a seat back 46 and a headrest 48, and a seat frame 49 providing the desired structural support for the seat assembly 40. The seat frame 49 generally includes a seat bottom frame portion 50, coupled to an upper seat frame portion 70 with a pivot base 90. The seat back 46, specifically the back frame 70, is pivotably coupled to the pivot base 90. More specifically, while the seat back 46 is capable of rotating about fixed axis B relative to the pivot base 90, the seat back 46 is constrained from other non-rotational movement. A seating support may provide the desired support for occupants between an outer frame extent that extends around or near the perimeter of the seating portions or areas that provide primary support for the occupant.

FIGS. 3, 4, 5, and 6 provide more detail regarding the seat frame 49, including the bottom frame 50, the back frame 70. The bottom and back frames 50, 70 are shown as made of tubular steel; however, it should be appreciated that many other materials and shapes may be used to form the bottom and back frames including for example, a C-shaped steel frame.

Figure 3:
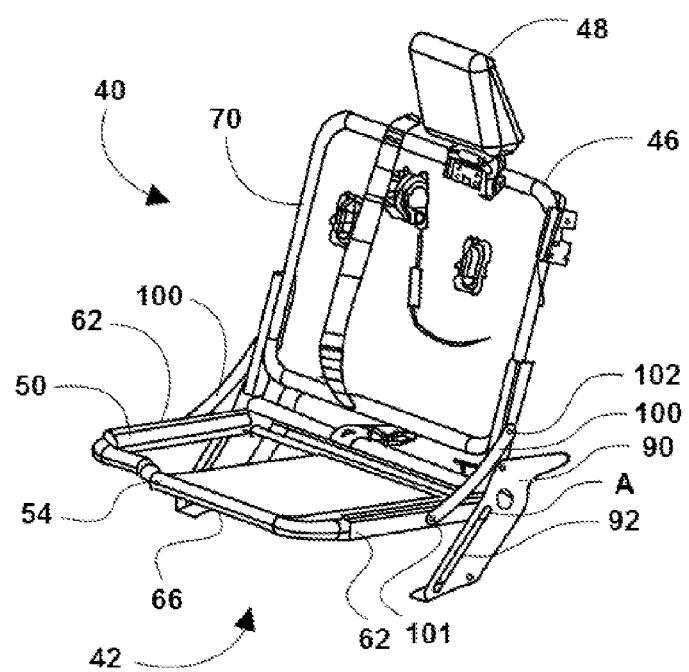
FIG. 3 is a left side and front perspective view of the seat in FIG. 1 in an open position with the surface material coverings and cushion portions removed to show the seat frame and related structural components.
Figure 4:
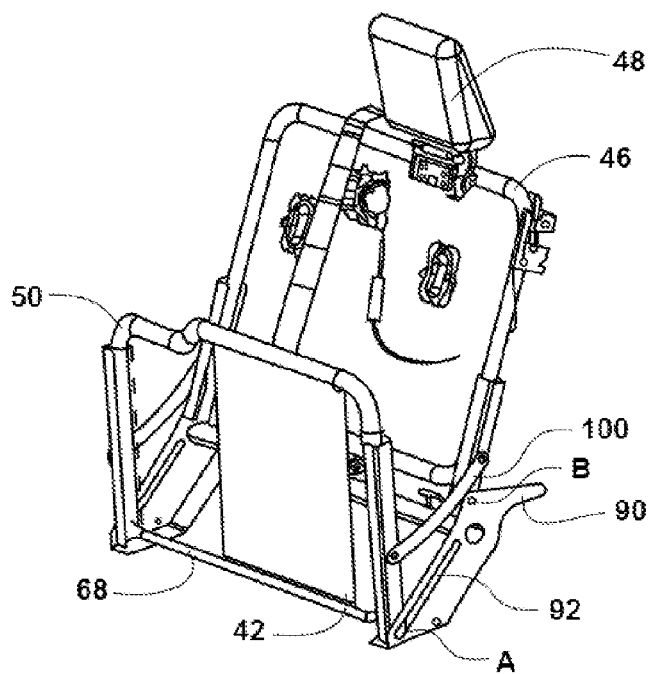
FIG. 4 is a perspective view of the seat from FIG. 3 with the seat bottom in a stowed upright position.

FIGS. 3 and 4 illustrate the seat assembly 40 with the core foam and trim cover removed includes the bottom frame 50 pivotably coupled via the pivot base 90 and a cross member 100 to the back frame 70. The bottom frame 50 includes an outer frame extent 66 having two lateral sides 62, a front extension 54 and a rear cross member 68. The bottom frame 50 and back frame 70 may be each formed from a single piece or multiple pieces. The bottom frame 50 is pivotably connected to the pivot base at movable pivot Axis A. The bottom frame 50 is further coupled to the back frame 70 through the cross member 100, and pivotably coupled to the cross member 100 at a first cross member pivot point 101. The back frame 70 is also coupled to the cross member at a second cross member pivot point 102.

The pivot base 90 may be mounted to any structure, that the seat is installed for use in, typically the floor pan of a vehicle. The pivot base 90 includes a substantially straight or linear slot 92 as illustrated in FIGS. 3-4 and 8-14 and a curved or arcuate profile slot 92 as illustrated in FIGS. 1-2 and 5-6, allowing constrained movement of the bottom frame 50 from the open position to the stadium position, as further described herein. The slot 92 may be overmolded to create low friction interfaces. The end stops may be steel for increased durability. The joints and pivot points are expected to have bushings, although some may be assembled without.

The bottom frame 50 is also supported in the open position by the frame cross member 100, typically a pair on each side of the seat assembly 40. The frame cross member 100 is pivotably connected to the bottom frame 50 and to the upper seat frame 70 providing support to the bottom frame 50 when in use by an occupant. As such, the bottom frame 50 has two contact points, one to the cross member 100 and another to the pivot base 90, specifically the moveable pivot point axis A, although the moveable pivot point axis A is moveable in the slot 92.

FIGS. 3, 4, and 8-10 further show the position of the frame cross member 100 relative to the lower seat frame 50, upper seat frame 70 and pivot base 90. The combination of the pivot base, slot 92 in the pivot base 90, show how the frames 50 and 70 are coupled to the pivot base 90 as well as the frame cross member 100 that allows for the three positions, fold forward, open and stowed.

FIGS. 3-4 show the seat assembly 40 in the open and stadium positions; however, the seat 40 is shown without the seat core and trim cover. The movement of the seat assembly 40, specifically the rear of the seat bottom 42 in illustrated in FIGS. 3 and 4. In the stadium position in FIG. 8C, the seat assembly 40 is shown fully collapsed toward the floor after having moved significantly downward by moving in the slot 92 of the pivot base 90. Most importantly, it should be appreciated that the overall height of the seat bottom 42 as the front edge is raised to the stadium position actually is lowered from the open position to the stadium position, as illustrated by the movement of the moveable pivot point axis A. To provide this reduction in height when in the stadium position, the bottom frame 50, specifically that closest to pivot axis A, a pin 51 moves in the slot 92 on the pivot base 90, moving downward toward the stadium position. More specifically the moveable pivot axis located at the rearward portion of the seat bottom is lowered through gravity as the seat back is rotated forward, and raised as the seat back is rotated rearward and upright due to being pulled by the cross member 100 and shape of the slot 92. It should also be recognized that while the slot 92 is illustrated as an open portion in the pivot base 90, it could also be a closed channel or other configuration, so long as it allows the similar movement of the seat assembly.

As clearly illustrated in FIG. 5, the seat assembly 40 may be configured to have the seat bottom configured to not only be stored in an upright position as illustrated in FIG. 4 but also be stowed in a lowered forward position as illustrated in FIG. 5. More specifically, the seat back 46 may be folded forward which allows the seat bottom specifically the pin 51 to slide to an intermediate position in the slot 92. As such, the seat bottom may be placed in relative close proximity to the floor pan of the vehicle and the seat back folded thereover to create a compact low height folded seat. The cross member brace 100 is configured to hold the seat bottom and specifically the pin 51, in the upper portion of the slot 92 along with the latching assembly 120 described below when the seat back is in an upright position. When the seat back is folded forward and downward and the latching assembly released, the pin slides forward and downward in the slot 92 thereby lowering the seat bottom to the floor pan, or toward the base of the pivot base 90.

Figure 7A:
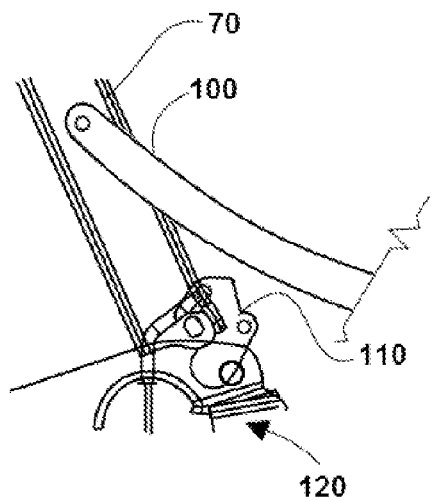
FIG. 7A is an enlarged right side view of the latch assembly with the seat bottom latch and cushion hook being engaged to maintain the seat bottom in an open position.
Figure 7B:
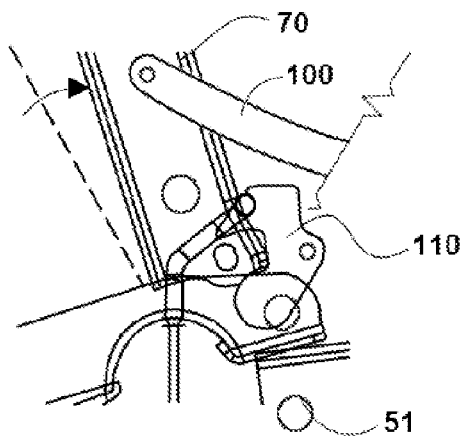
FIG. 7B is an enlarged right side view of the latch assembly in FIG. 7A showing the seat bottom latch disengaging when the seatback is rotated forward.
Figure 7C:
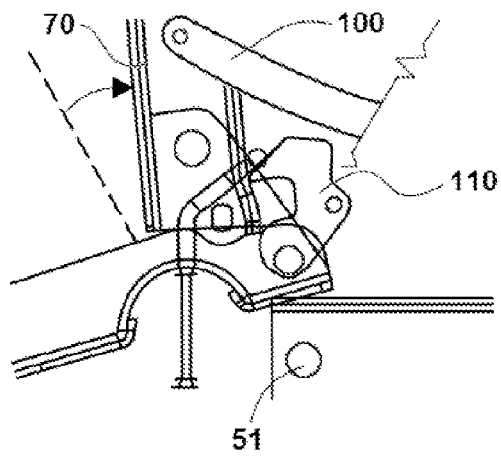
FIG. 7C is an enlarged right side view of the latch assembly in FIG. 7B with the seat back rotated further forward than in FIG. 7B.

The latching mechanism 120 is further illustrated in FIGS. 7A-7C. In FIG. 7A, the latching mechanism is engaged when the cushion hook 110 engages the seat back to prevent the seat back from rotating forward. FIG. 7B further illustrates the seat back being unlatched and slightly rotated forward. As further illustrated in FIG. 7B, the seatback is unlatched and rotated forward, which allows a pin to rotate under the cushion hook, disengaging the hook 110 or latch. FIG. 7C further illustrates the seat back being rotated forward, however, it should also be noticed that the pin 51 still remains in the upper portion of the slot 92 until the seat back extends beyond its maximum height or axis of its rotation (not illustrated). By maintaining the pin 51 in the upper portion of the slot until the seat back has rotated substantially forward, helps keep the lower seat bottom 42 in place and allows for reclining movement of the seat back as further illustrated in FIG. 14 without affecting the bottom of the seat 42. More specifically, the center of gravity of the seat bottom 42 is forward of the cross member 100 thereby causing the pin 51 to be engaged at the end of the slot until the seat bottom 42 makes contact with the floor when moving to the stowed position and then the cross member 100 further drives the pin down the slot causing the seat bottom to move substantially in alignment with the floor. In addition, when the seat back is rotated to its open position, the cross member 100 pulls the seat bottom upward and the center of gravity of the seat bottom being forward of the pin cause the pin 51 to slide up the slot 92, and engage the end of the slot before the seat bottom 42 is pulled into its desired alignment by the cross member or link 100.

FIGS. 8-10 more specifically illustrate the three positions of the seat assembly 40. More specifically in FIG. 8, the seat 40 is illustrated in a stadium position with the seat back 46 upright and the seat bottom 42 also in an upright position stowed substantially against the seat back 46. In this position, the pin 51 is located substantially in the lower portion of the slot 92. A catch or cam system may be located to engage the seat back or more specifically seat base in this stadium position. The cross member 100 as illustrated in FIG. 8 is specifically configured to not only have the right arcuate length or straight length, and position placement when the seat is in its open position but also when it is in its stored position such that the seat bottom is stowed as closely as possible to the seat back 46. Of course, the length and shape of the cross member 100 may vary depending upon the application, the size, shape and configuration of the other seating components including the seat back 46 and the seat base 42 as well as the pivot base 90. The latch, as illustrated in FIGS. 7A-7C and FIG. 8, is configured to allow disengagement of the seat bottom when the seat bottom is in both the stowed and stadium positions. Therefore, when the seat back has a high latch system (not shown) and the user disengages the high latch, the rotation of the seat back 46 forward automatically disengages the latch assembly on the seat bottom as illustrated and thereby allows the seat bottom 42 to move flush to the floor without interaction of the user except rotating the seat back 46 forward. As illustrated in FIG. 8, the hook or catch 110 has a cam face for locking the cushion up. If the seat back 46 is stowed from stadium, or rotated forward from stadium to the stowed position, the hook or catch 110 rotates and disengages, allowing the seat bottom to move to the stowed position because the pin 51 is now free to move in the slot 92 toward the fixed pivot B.

FIG. 9 illustrates the seat as being in the open position. In the open position, the seat bottom is outward and ready to receive a vehicle occupant with the pin 51 being located in the upper portion of the slot 92 near the seat back 46. As identified in FIG. 9, the slots are typically overmolded in certain areas to create low friction interfaces to help movement between the stowed, open, and forward positions. However, to maintain tolerances of various members of the seat, it is expected that the ends of the slot 92 would not be overmolded to provide consistent tolerances throughout the life of the seat assembly. As further illustrated in FIG. 10, the seat is moved to a stowed position with the seat bottom, specifically the pin 51, sliding downward and forward as the seat back 46 is rotated over the seat bottom 42. The seat bottom in FIGS. 8-10 is illustrated with the frame, however, a cushion and surface material could be added. The stadium release may be on the front of the seat bottom for ease of use and operation.

Figure 11:
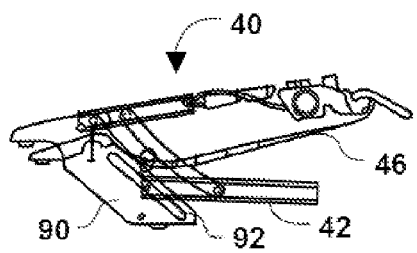
FIG. 11 is a right side view of the seat illustrating the seat moving from a stowed position, including intermediary views, to an open position, and shows clearance of the lower seat portion and seat back during movement.
Figure 11:
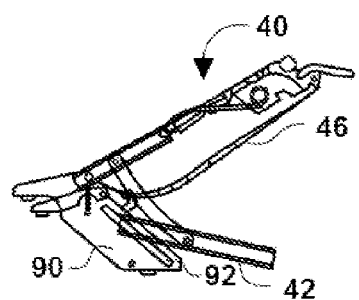
Figure 11:
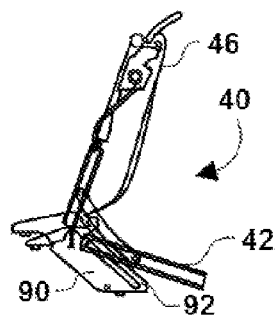
Figure 11:
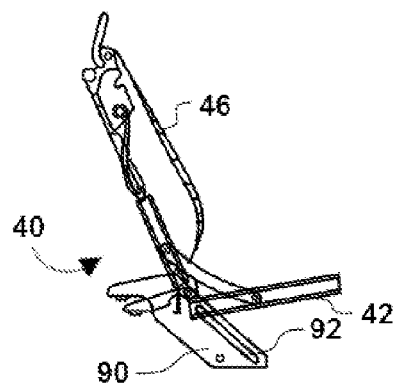
Figure 12:
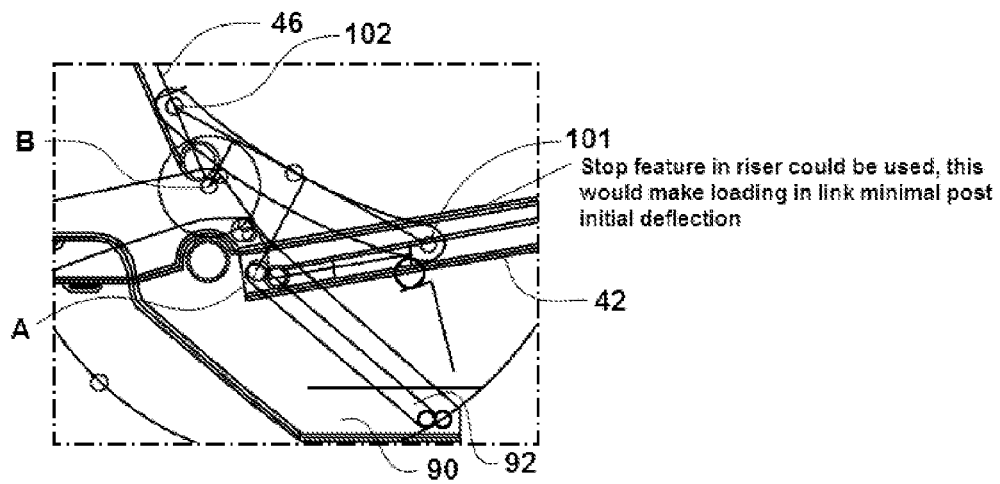
FIG. 12 is a right side partial view of a low locking latch assembly
Figure 12:
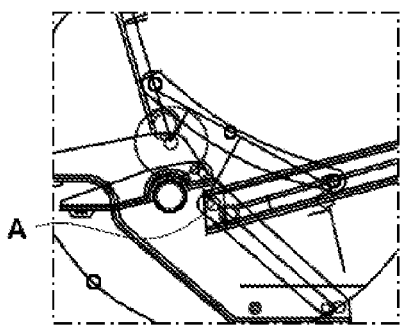
Figure 12:
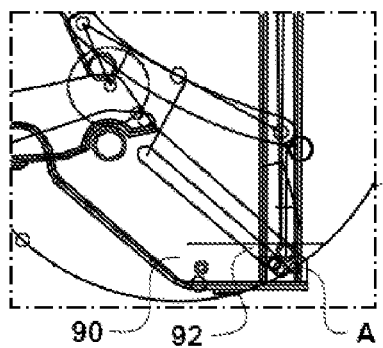
Figure 12:
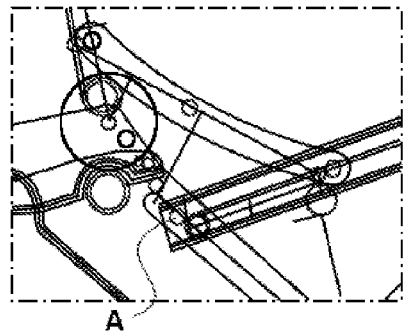
Figure 13:
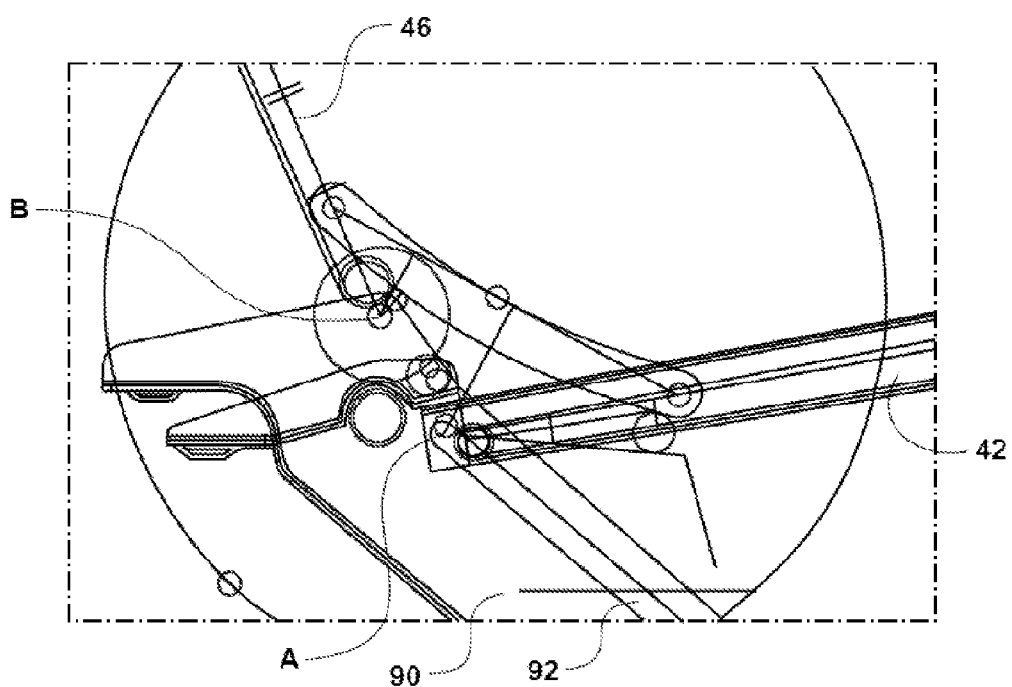
FIG. 13 is a right side view of the latch assembly and pivot mechanisms.

FIG. 11 further illustrates the movement from the stowed position back to the upright position and the various positions that the seat bottom and seat back take relative to each other. As the seat back 46 is rotated rearward to its upright position, the cross brace member 100 pulls on the seat back thereby forcing the pin 51 rearward and upward toward the pivot axis of the seat back 46. As illustrated in FIG. 11, during the intermediate steps, the seat bottom 42 is temporarily tilted downward at the front edge, however, when the pin 51 engages the upper portion of the slot 92 and the seat back 46 is further rotated rearward, the cross member 100 pulls the seating bottom into a more upright position. Of course, it should be recognized that the latching assembly, slot or cross member may be adjustable so that the end position specifically the angle of the seat base relative to the floor pan may be adjusted to have variable height at the front edge of the seat bottom 42 between vehicle occupants to improve comfort. As further illustrated in FIG. 11, because the cushion is configured to not go over the center, it will not bind when returning from the stowed position or in going to the stowed position. Further, with the greatest mass at the end of the cushion, the seat moves from stow to seating position, and back. The friction of the slot and pin can be adjusted so that the seat bottom may be placed in intermediate positions between stadium and stowed position, however it is expected that the friction will be adjusted so that the seat bottom moves easily. If the seat is on a track, such as it was moveable relative to the floor pan, a low recliner lock would be used.

A seat assembly comprising a seat back and seat bottom each coupled to a pivot base having a slot. The seat bottom includes a pin configured to slide in the slot, and wherein the seat bottom is capable of being stowed in an upright position (stadium position) or a lower position substantially aligned with and in close proximity to the floor (stowed position). As the seat back is rotated about a pivot axis on the pivot base, a latch assembly is automatically disengaged, causing the seat bottom to move to the stowed position from an open position or the stadium position without further action by the user. A link or cross member 100 between the seat back 46 and seat bottom 42 drives the seat bottom to the stowed position or pulls it back to the open position depending on the direction of rotation of the seat back.

Figure 14:
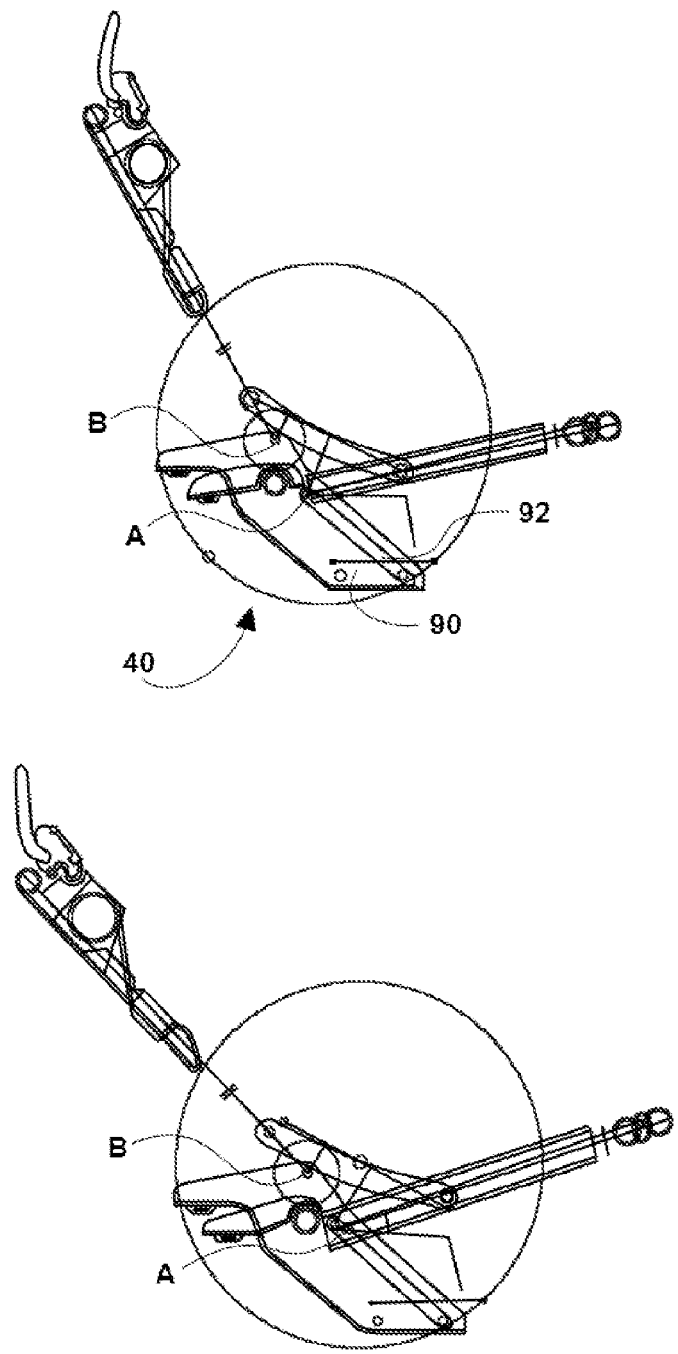
FIG. 14 illustrates an open position and a reclined position for the seat.

As illustrated in FIG. 14, the seat back 46 may, in some embodiments, be capable of adjusting the recline position.

The foregoing invention has been described in accordance with the relevant legal standards, thus the description is exemplary rather than limiting in nature. Variations and modifications to the disclosed embodiment may become apparent to those skilled in the art and fall within the scope of the invention. In addition, any measurements, dimensions, or numbers provided in the specification or drawings are exemplary, should not be considered limiting, and may vary depending upon the size, shape, configuration or desired application and many modifications may be made to adapt such measurements, dimensions, or numbers without departing from the essential scope thereof.

The invention claimed is:

1. A seat assembly comprising:
   a pivot base having a slot configured to constrain movement of a moveable pivot point and capable of restraining a fixed pivot point from movement relative to said pivot base;
   a seat bottom including a seat bottom frame having a front extension and wherein said seat bottom is capable of movement about said moveable pivot point between a stadium position and an open position;
   a seat back coupled to said pivot base at said fixed pivot point and capable of movement about said fixed pivot point;
   a cross member coupled to each of said seat bottom and said seat back;
   wherein said seat assembly has at least three positions, including an open position, a stadium position, and a stowed position and wherein in said stadium and open positions said seat back is approximately vertical and in said stowed position said seat back is more horizontal than vertical; and said seat bottom is approximately vertical in said stadium position and approximately horizontal in said stowed position and capable of receiving an occupant in said open position;
   said slot has a contour and wherein as said seat assembly is moved from said open position to said stadium position, said front extension rotates about said moveable pivot point toward said seat back and said moveable pivot point moves away from said fixed pivot point following said contour of said slot; and
   said movable pivot point is closer to a base of said pivot base in said stadium position than said stowed position and said open position.

2. The seat assembly of claim 1 wherein said seat back is fixed from movement relative to said pivot base, except for rotational movement about said fixed pivot.

3. The seat assembly of claim 1 wherein said seat bottom is capable of rotational movement about said moveable pivot point and capable of movement relative to said pivot base and said seat back in addition to said rotational movement.

4. The seat assembly of claim 1 wherein said seat bottom includes a first cross member pivot point and said seat back includes a second cross member pivot point and wherein said cross member is coupled to said seat back at said second cross member pivot point and said seat bottom at said first cross member pivot point and wherein said seat bottom includes a center of gravity that is not located between said moveable pivot point and said first cross member pivot point.

5. The seat assembly of claim 4 wherein said seat bottom includes a seat bottom frame having an outer extent including a front extension, lateral sides and wherein said center of gravity is closer to said first cross member pivot point than said front extension.

6. The seat assembly of claim 1 wherein said moveable pivot point is configured to move away from said fixed pivot point as said seat back is rotated about said fixed pivot point toward said seat bottom.

7. The seat assembly of claim 1 wherein said moveable pivot point approaches a base of said pivot base in said slot as said seat back is rotated about said fixed pivot point toward said seat bottom.

8. The seat assembly of claim 1 wherein said pivot base includes a forward extent and a rearward extent, said rearward extent being proximate to said fixed pivot point and wherein said slot extends from proximate said fixed pivot point toward said forward extent and ends proximate said forward extent.

9. The seat assembly of claim 1 further including a latch assembly having a catch coupled to said seat bottom and wherein catch is coupled to said seat back in said open position and said catch is disengaged from said seat back in a stowed portion and said stadium position.

10. The seat assembly of claim 1 wherein as said seat assembly is moved from said open position to said stowed position, said seatback is rotated above said fixed pivot point and said seat bottom is moved away from said fixed pivot point and approaches a base of said pivot base.

11. The seat assembly of claim 1 wherein said seat bottom is free of legs.

* * * * *